July 7, 1953 H. E. CORNISH Re. 23,681
FOLDING BABY CARRIAGE
Original Filed Sept. 25, 1946 2 Sheets-Sheet 1
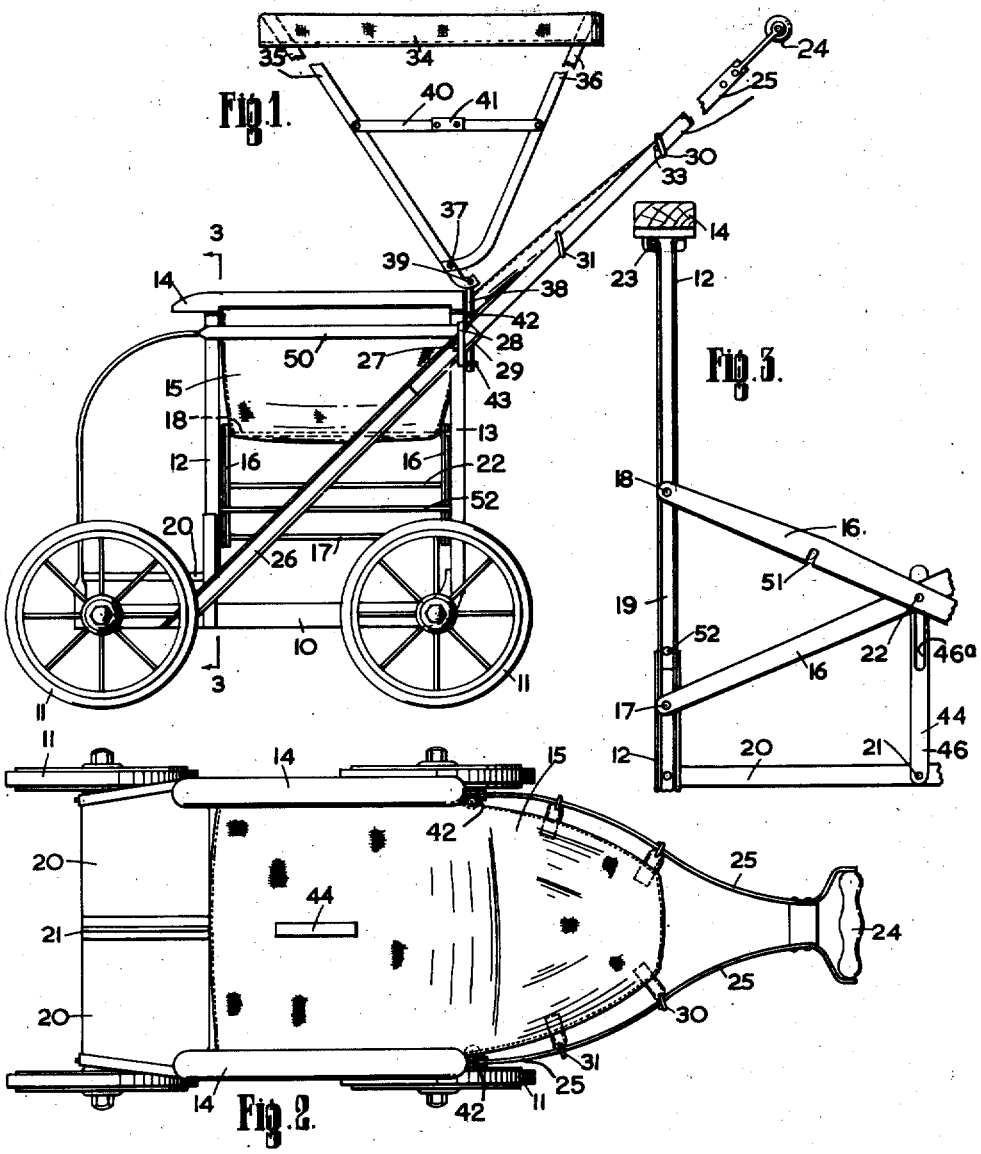
H. E. Cornish
INVENTOR.
BY
Mason Porter Miller & Stewart
Attorneys July 7, 1953 H. E. CORNISH Re. 23,681

FOLDING BABY CARRIAGE

Original Filed Sept. 25, 1946 2 Sheets-Sheet 2

H. E. Cornish

INVENTOR.

BY

Mason Porter Miller & Stewart

Attorneys

Reissued July 7, 1953 Re. 23,681

UNITED STATES PATENT OFFICE 23,681

FOLDING BABY CARRIAGE

Harold Edward Cornish, Banktown, New South Wales, Australia

Original No. 2,545,069, dated March 13, 1951, Serial No. 699,220, September 25, 1946. Application for reissue March 7, 1952, Serial No. 275,390. In Great Britain October 18, 1945

7 Claims. (Cl. 280—42)

Matter enclosed in heavy brackets [ ] appears in the original patent but forms no part of this reissue specification; matter printed in italics indicates the additions made by reissue.

This invention relates to improvements in perambulators and baby carriages with more particular reference to baby carriages, collapsible about a longitudinal axis, in which the sides of the carriage are brought close together.

An object of the invention is to provide a more robust construction of this type of folding baby carriage than has hitherto been known while yet enabling the carriage to be easily collapsed so that the sides are brought close together, and further to provide a simple means of effectively locking the carriage in its collapsed state.

A further object of the invention is to provide a readily detachable hood assembly, which may, nevertheless, be collapsed in situ together with the carriage.

According to the present invention a folding wheeled child's carriage comprises in combination a pair of rigid skeleton side frames, arm rests on said frames, a flexible seat fitted to said arm rests and dependent therefrom, transverse diagonal struts fixedly pivoted to the side frames at their lower ends and slidably pivoted to the side frames at their upper ends, longitudinal rods interconnecting the upper ends of the struts and passing through the seat, longitudinal diagonal guide members secured to the side frames, a control handle, and a pair of arms depending from said control handle and slidable in said guide members to lock the carriage in the collapsed position.

The invention will be further described with reference to the accompanying drawings in which:

Fig. 1 is a side elevation of a collapsible baby carriage,

Fig. 2 is a plan view with the hood removed,

Fig. 3 is an enlarged fragmentary section on the line 3—3 of Fig. 1,

Figure 4:
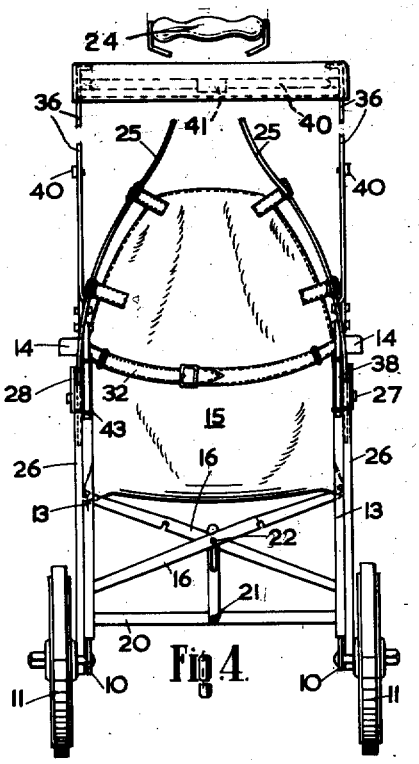
Fig. 4 is a rear end elevation.

Two bearer members 10 carry wheels 11 on stub axles. The bearer members 10 carry four vertical channel section members 12, 13 interconnected by longitudinal horizontal bars 50 and surmounted by arm rests 14. The parts 10, 12, 13 and 50 form a pair of rigid skeleton side frames one on each side of the carriage.

The arm rests 14 are pivoted at 23 to the channel section members 12, 13. A seat 15 is fixedly located at 14a to the undersides of the arm rests 14.

Figure 6:
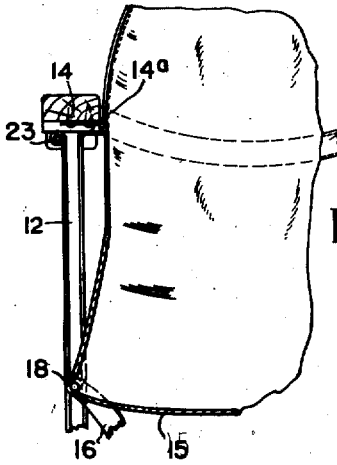
Fig. 6 is a sectional detail of the flexible seat.

Members 19 are slidably located within the channel section members 12, 13 and are interconnected by longitudinal horizontal rods 18, 52. The rods 18 extend through the seat 15 (see Fig. 6). The channel section members 12, 13 are interconnected by longitudinal horizontal rods 17. Transverse diagonal struts 16 are pivotally connected at their ends to the rods 18, 17 and pivoted to one another intermediate their ends to a central longitudinal rod 22. A footrest comprises two half-sections 20 hinged together at 21 and hinged at their outer ends to the sides of the carriage. The footrest is supported at its central hinge from the rod 22 by means of a vertical link member 46 having a slot 46a. The struts 16 are notched at 51 to accommodate the rods 52 in the collapsed position of the carriage.

Two spring steel arms 25 are slidably located in longitudinal diagonal guide members 26 secured to the side frames of the carriage. In the drawings the arms 25 are shown in the extended position. The upper ends of the steel arms 25 are interconnected by a control handle 24. Extension of the arms 25 is limited by outwardly projecting studs 27 at the lower ends thereof which in the extended position of the strips abut against stop plates 28 secured to the members 13. Inwardly projecting studs (not shown) on the arms 25 engage over the upper ends 29 of the members 26 to retain the arms in the extended position.

The fabric seat 15 is extended to form a back rest supported from the arms 25 by rings 30, 31 and braced by means of an adjustable strap 32 connected to the arm rests 14. The back rest is held in its extended position by outwardly projecting studs 33 on the arms 25.

A hood 34 is carried on a framework comprising frame members 35, 36 hinged together at 37 and hinged at 39 to rods 38 engaging in extensions 42, 43 of the members 13. The side members are pivotally connected by longitudinal and transverse struts 40 interconnected by links 41.

A handle 44 is provided on the seat 15 to facilitate the collapsing of the carriage.

Figure 5:
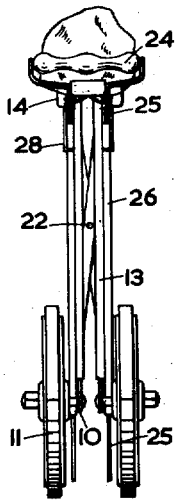
Fig. 5 is a corresponding rear end elevation of the collapsed carriage.

To collapse the carriage, the hood is first partially collapsed by raising the links 41. The seat 15 is raised by the handle 44 to raise the rods 18 and actuate the struts 16 to displace the side frames of the carriage towards each other. The arm rests 14 are then pivoted upwardly to enable the seat 15 to be compactly stowed therebetween. The hood may be removed from the extensions 42, 43 or may be pivoted about the hinges 39 to rest above the arm rests. The arms 25 are depressed into the position shown in Fig. 5 to lock the carriage in the collapsed position.

I declare that what I claim is:

1. A folding wheeled child's carriage comprising in combination a pair of rigid skeleton side frames, arm rests on said frames, a flexible seat fitted to said arm rests and dependent therefrom, transverse diagonal struts fixedly pivoted to the side frames at their lower ends and slidably pivoted to the side frames at their upper ends, longitudinal rods interconnecting the upper ends of the struts and passing through the seat, longitudinal diagonal guide members secured to the side frames, a control handle, and a pair of arms depending from said control handle and slidable in said guide members to lock the carriage in the collapsed position.

2. A folding wheeled child's carriage comprising in combination a pair of rigid skeleton side frames, arm rests longitudinally pivoted to said side frames, a flexible seat fitted to said arm rests and dependent therefrom, transverse diagonal struts fixedly pivoted to the side frames at their lower ends and slidably pivoted to the side frames at their upper ends, longitudinal rods interconnecting the upper ends of the struts and passing through the seat, longitudinal diagonal guide members secured to the side frames, a control handle, and a pair of arms depending from said control handle and slidable in said guide members to lock the carriage in the collapsed position.

*3. A folding wheeled child's carriage comprising in combination a pair of rigid skeleton side frames, a collapsible seat carried by the frames, transverse strut means connecting the side frames to limit the relative outward unfolding movements thereof and foldable to permit relative inward folding movements thereof, longitudinal diagonal guide members secured to the side frames, a spring arm slidable in each of said guide members and a handle permanently connecting the ends of the spring arms, said arms inwardly of the handle being spaced apart a distance substantially equal to the combined width of the side frames when the carriage is folded.*

*4. A folding wheeled child's carriage comprising in combination a pair of rigid skeleton side frames, a collapsible seat carried by the frames, transverse diagonal struts fixedly pivoted at one end to a side frame and slidably pivoted at the other end to the opposite side frame to permit limited relative inward folding and outward unfolding movements of the side frames, longitudinal diagonal guide members secured to the side frames, a spring arm slidable in each of said guide members and a handle permanently connecting the ends of the spring arms, said arms inwardly of the handle being spaced apart by a distance substantially equal to the combined width of the side frames when the carriage is folded.*

*5. A folding wheeled child's carriage comprising in combination a pair of rigid skeleton side frames, a collapsible seat carried by the frames, transverse diagonal struts each fixedly pivoted at its lower end to one of said side frames and slidably pivoted at its upper end to the other side frame, longitudinal diagonal guide members secured to the side frames, a spring arm slidable in each of said guide members and a handle permanently connecting the ends of the spring arms, said arms inwardly of the handle being spaced apart by a distance substantially equal to the combined width of the side frames when the carriage is folded.*

*6. A folding wheeled child's carriage comprising in combination a pair of rigid skeleton side frames, a collapsible seat carried by the frames, transverse diagonal struts each fixedly pivoted at its lower end to one of said side frames and slidably pivoted at its upper end to the other side frame, longitudinal diagonal guide members secured to the side frames, a spring arm slidable in each of said guide members, a spacing member for separating the outer portions of said arms substantially the combined width of the side frames when folded inwardly and a permanent handle connecting the ends of the arms beyond the spacing member.*

*7. A folding wheeled child's carriage comprising in combination a pair of rigid skeleton side frames, a collapsible seat carried by the frames, transverse diagonal struts each fixedly pivoted at its lower end to one of said side frames and slidably pivoted at its upper end to the other side frame, longitudinal diagonal guide members secured to the side frames, a spring arm slidable in each of said guide members, a spacing member for separating the outer portions of said arms substantially the combined width of the side frames when folded inwardly and a permanent handle connecting the ends of the arms beyond the spacing member, and having a length substantially equal to the overall width of the carriage when folded.*

HAROLD EDWARD CORNISH.

References Cited in the file of this patent or the original patent

UNITED STATES PATENTS

| Number | Name | Date |
|---|---|---|
| 729,651 | Olofsson | June 2, 1903 |
| 766,537 | Simpson | Aug. 2, 1904 |
| 1,234,797 | Parmenter | July 31, 1917 |